June 14, 1938.    D. D. BOOTHBY    2,120,795
HEATER
Filed March 3, 1937
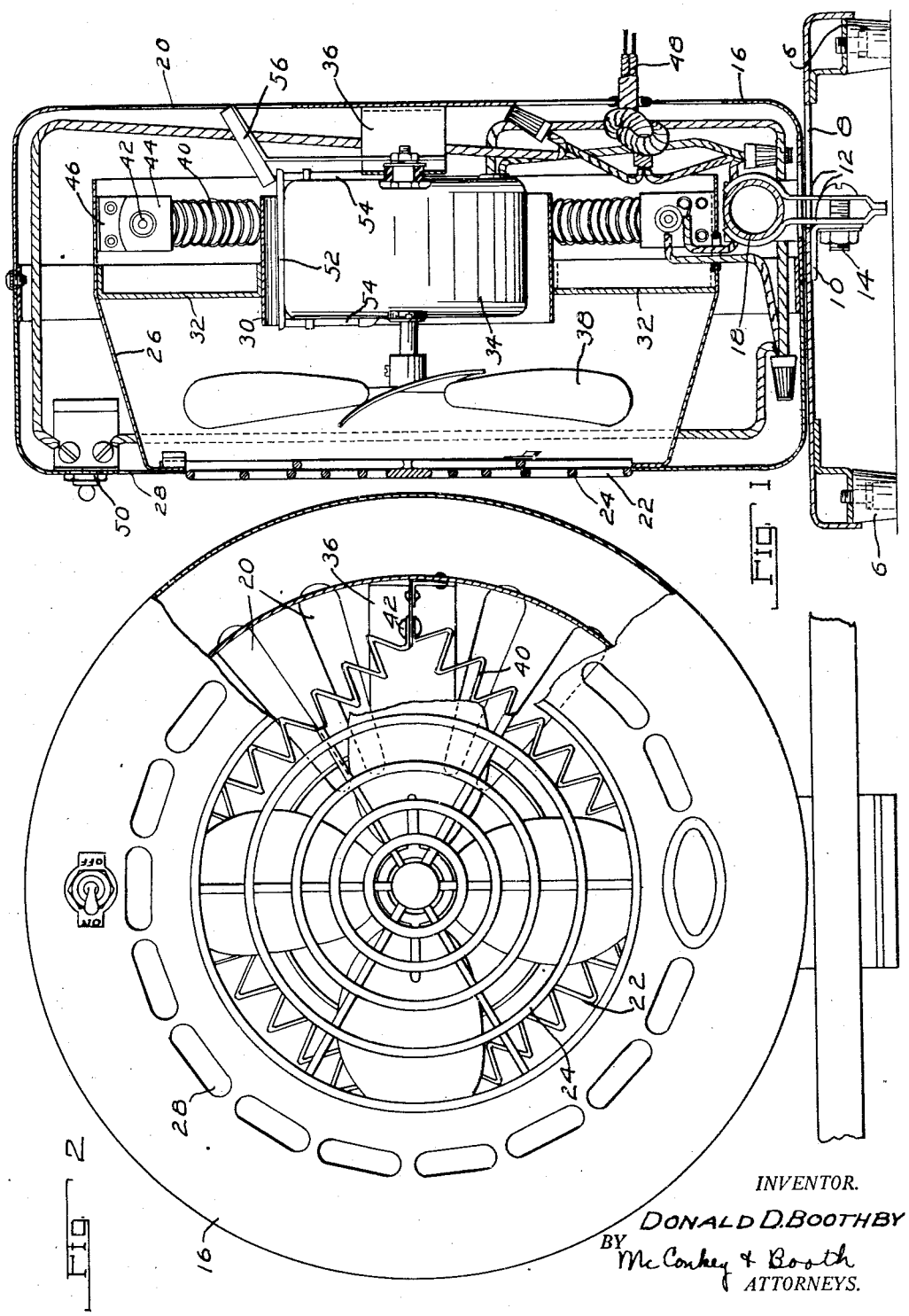

Patented June 14, 1938

2,120,795

UNITED STATES PATENT OFFICE 2,120,795

HEATER

Donald D. Boothby, Chicago, Ill., assignor to Air Devices Corporation, Chicago, Ill., a corporation of Delaware Application March 3, 1937, Serial No. 128,709

8 Claims. (Cl. 219—39)

This invention relates to heaters and more particularly to portable fan-type electric heaters.

One of the objects of the invention is to provide a portable heater which is angularly adjustable to direct the heated air in any desired direction. Preferably the heater includes an encased fan and heating coil with the casing pivotally mounted on a flat base which is formed with an opening into which one side of the casing may project. This arrangement permits a wide range of adjustment of the casing on the base without the necessity for a large clearance between the base and casing.

Another object of the invention is to provide an encased heater in which the casing is kept cool at all times. This may be accomplished by providing an annular shell secured around an outlet opening of the casing with a series of inlet openings between the shell and casing through which air circulates to cool the casing. The motor and heating element are mounted within this shell, a second shell preferably being provided around the motor to provide a passage for cooling air therearound and to shield it from the heating means.

Various other objects and advantages of the invention including novel means for lubricating the motor and for supporting the motor and other desirable features will appear from the following description of the accompanying drawing, in which:

Figure 1 is a central vertical section with parts in elevation of a heater embodying the invention, and Figure 2 is a front view of the heater with a part of the casing broken away.

The illustrated heater includes a flat sheet-metal base 4 supported on a plurality of rubber pads or the like 6 and having an opening 8 therethrough. A bracket 10 secured to the lower surface of the base carries a pair of clamp members 12 which are secured to each other and to the bracket 10 by a bolt 14.

The clamp members 12 extend through the hole 8 and through the bottom of a cylindrical sheet metal casing 16 to engage a pivot rod 18 carried by the casing at its lower part and lying substantially horizontal at a right angle to the casing axis. The rod 18 and clamp members 12 form a frictional pivot joint about which the casing may be tilted to raise or lower the delivery of heated air therefrom, the lower rear edge of the casing extending through the hole 8 in the base as the casing is tilted. This construction enables the casing to be tilted through a substantial angle without the necessity of a large clearance between the casing and base which would increase the overall height of the heater.

The casing 16 is formed at its rear end with a series of air inlet openings 20 and at its front end with a circular air outlet opening 22 of smaller diameter than the casing and which is preferably covered by a grille 24. An annular sheet metal shell or ring 26 is secured to the front of the casing around the outlet opening 22 and extends into the casing to a point spaced from the back thereof to leave an air passage. Air circulates through the space between the casing and shell 26 through a series of inlet openings 28 formed in the front of the casing between the point of attachment of the shell 26 and the periphery of the casing in a manner to be described later.

A second annular sheet metal shell or ring 30 of much shorter axial extent than the shell 26 is mounted coaxially with and adjacent the rear end of the shell 26 by means of a series of supporting brackets 32. The shell 30 surrounds and is spaced from an electric motor 34 which is rigidly carried by a mounting bracket 36 extending diametrically across the rear of the casing and which drives a fan 38 arranged within the shell 26 behind the grille 24.

Air circulating through the casing is heated by means of an electric heating coil 40 mounted in the annular space between the shells 26 and 30 in the path of air flowing therebetween. As shown, the coil 40 is former of a plurality of separate lengths of resistance wire having their ends connected in series by rivets or the like 42 extending through plates 44 of mica or other suitable insulating material which are supported on brackets 46 carried by the shell 26. The ends of the coil 40 are connected in parallel with the motor 34 to a line 48 adapted to be plugged into the usual wall or light socket, a switch 50 being provided to control the motor and coil simultaneously.

In order to lubricate the motor 34 a trough 52 is provided across the top thereof connected to the motor shaft bearings by ducts 54. Oil may be supplied to the trough 52 through a trough 56 carried by the bracket 36 and terminating adjacent one of the air inlet openings 20. Oil poured into the trough 56 flows into the trough 52 and through the ducts 54 into the motor shaft bearings to lubricate them simultaneously.

When the motor is running air will be drawn in through the openings 20 and heated by its passage around the coil 40 and forced out through the front of the casing. The shell 30 serves both to protect the motor from direct radiation of heat from the coil 40 and to form an annular passage around the motor through which cooling air may flow. Since operation of the fan produces a low pressure area at the rear of the casing, air will be drawn in from the front through the openings 28 to circulate through the space between the casing and the shell 26 thereby keeping the outside of the casing cool.

If it is desired to adjust the air discharge vertically the casing 16 may be tilted about the pivot joint formed by the rod 18 and clamps 12, the friction serving to hold the casing in any adjusted position. Since the unit is light any desired horizontal adjustment may be made by shifting the entire heater bodily.

While one heater embodying the invention has been shown and described in detail it will be understood that many changes might be made therein as will be apparent to those skilled in the art. It is accordingly not intended to limit the scope of the invention to the exact construction illustrated nor otherwise than by the terms of the appended claims.

What is claimed is:

1. A heater comprising a flat base, a casing mounted on said base, heating means and air circulating means in said casing, and means for pivotally mounting the casing on said base for pivotal movement about a substantially horizontal axis, said base being formed with an opening into which one side of the casing projects when the casing is tilted.

2. A heater comprising a flat base, a casing mounted on said base, heating means and air circulating means in said casing, a pivot rod extending substantially horizontally across the casing, and clamp means carried by the base and engaging said rod to form a pivotal connection, said base being formed with an opening into which one side of the casing projects when it is pivoted about said rod.

3. A heater comprising a flat sheet-metal base, a cylindrical casing mounted on said base, heating means and air circulating means in the casing, and means for mounting said casing on the base for pivotal movement about a substantially horizontal axis, said base having an opening therein through which one side of the casing projects when the casing is tilted.

4. A heater comprising a flat sheet-metal base, a cylindrical casing mounted on said base, heating means and air circulating means in the casing, a pivot rod extending substantially horizontally across the casing at the lower part thereof and at right angles to the casing axis, and clamping means secured to the bottom side of said base and projecting through an opening therein and through an opening in the bottom of the casing to engage said rod and form a pivotal joint therewith, the opening in the base being of such size and shape that one side of the casing projects therethrough when the casing is pivoted about said rod.

5. A heater comprising a hollow casing having an air inlet opening in its back and an air outlet opening in its front, an annular shell in the casing secured to the casing front around said air outlet opening with its rear edge spaced from the back of the casing, said casing having a second air inlet opening in its front between said shell and the casing periphery, a motor mounted centrally of said shell at the rear part thereof, a fan in said shell adjacent the front thereof and driven by said motor, a second annular shell around the motor and spaced therefrom to form a passage for air to cool the motor, and heating means in the annular space between said two shells.

6. A heater comprising a hollow casing having an air inlet opening in its back and an air outlet opening in its front, an annular shell in the casing secured to the casing front around said air outlet opening with its rear edge spaced from the back of the casing, said casing having a second air inlet opening in its front between said shell and the casing periphery, a mounting bracket secured diametrically across the back of the casing, a motor secured to said bracket centrally thereof and lying within the shell, a second annular shell secured to the first named shell and surrounding and spaced from the motor, insulating means secured to the first named shell at spaced points around the motor, and an electric heating coil secured to said insulating means and lying in the annular space between the two shells.

7. A heater comprising a cylindrical sheet metal casing having an air inlet opening in its back and an air outlet opening of smaller diameter than the casing in its front, an annular sheet metal shell secured to the front of the casing around the outlet opening and terminating short of the back of the casing, the front of the casing being formed with a series of air inlet openings between the casing periphery and the point of attachment of said shell to provide for circulation of air between the shell and casing, a second annular sheet metal shell mounted concentrically with said first named shell adjacent the rear end thereof, a motor mounted in said second shell and spaced therefrom to provide a passage for cooling air, lubricant ducts connected to said motor, a lubricant trough for supplying lubricant to said ducts and extending adjacent the air inlet opening in the casing back, a fan in the front part of the first named shell drivably connected to the motor, and heating means in the annular space between the shells.

8. A heater comprising a cylindrical casing, a motor mounted centrally of the casing adjacent the rear thereof, a fan in the front part of the casing driven by said motor, heating means surrounding the motor to heat air circulated through the casing by the fan, a flat base and means for pivotally mounting the casing on said base, said base being formed with an opening to receive one side of the casing when it is tilted.

DONALD D. BOOTHBY.